US008526631B2

(12) United States Patent
Nakabayashi

(10) Patent No.: US 8,526,631 B2
(45) Date of Patent: Sep. 3, 2013

(54) AUDIO DEVICE

(75) Inventor: Takeo Nakabayashi, Asaka (JP)

(73) Assignee: Pioneer Corporation, Tokyo (JP)

( * ) Notice: Subject to any disclaimer, the term of this patent is extended or adjusted under 35 U.S.C. 154(b) by 913 days.

(21) Appl. No.: 12/532,297

(22) PCT Filed: Mar. 19, 2007

(86) PCT No.: PCT/JP2007/055545
§ 371 (c)(1),
(2), (4) Date: Sep. 21, 2009

(87) PCT Pub. No.: WO2008/114387
PCT Pub. Date: Sep. 25, 2008

(65) Prior Publication Data

US 2010/0104111 A1 Apr. 29, 2010

(51) Int. Cl.
*H04B 1/00* (2006.01)

(52) U.S. Cl.
USPC ................................ 381/86; 381/104; 700/94

(58) Field of Classification Search
USPC ..... 381/1-23, 300-311, 86, 77-85, 104-106; 700/94
See application file for complete search history.

(56) References Cited

U.S. PATENT DOCUMENTS

| | | | | |
|---|---|---|---|---|
| 7,117,286 | B2 * | 10/2006 | Falcon | 710/303 |
| 7,228,188 | B1 * | 6/2007 | Aihara et al. | 700/94 |
| 7,765,046 | B2 * | 7/2010 | Takimoto et al. | 701/36 |
| 7,826,318 | B2 * | 11/2010 | Holden et al. | 369/47.28 |
| 8,068,882 | B2 * | 11/2011 | Davis et al. | 455/569.1 |
| 8,086,332 | B2 * | 12/2011 | Dorogusker et al. | 700/94 |
| 2007/0055395 | A1 * | 3/2007 | Debettencourt et al. | 700/94 |
| 2008/0161950 | A1 * | 7/2008 | Ozaki et al. | 700/94 |
| 2008/0215169 | A1 * | 9/2008 | deBettencourt et al. | 700/94 |

FOREIGN PATENT DOCUMENTS

| | | |
|---|---|---|
| JP | 2002-281119 | 9/2002 |
| JP | 2006-048867 | 2/2006 |
| JP | 2006-170752 | 6/2006 |
| JP | 2006-170753 | 6/2006 |

OTHER PUBLICATIONS

International Search Report, PCT/JP2007/055545, Apr. 17, 2007.

(Continued)

*Primary Examiner* — Vivian Chin
*Assistant Examiner* — Fatimat O Olaniran
(74) *Attorney, Agent, or Firm* — Young & Thompson

(57) ABSTRACT

An audio device 100 which replays audio on the basis of an external audio signal PAS outputted from a portable audio device (500) includes: a power supply unit 170, that is a power supply element which supplies power at a predetermined voltage to the portable audio device 500; a control unit 110, that is a control element which, along with notifying to the portable audio device 500 function setting information FRP that is operability information specifying whether or not inherent actuation input is possible using an inherent actuation input element provided to the portable audio device, also controls the details notified; and speakers $\mathbf{130}_L$ and $\mathbf{130}_R$, that are audio replay element for replaying audio on the basis of the external audio signal PAS. As a result, an audio device 100 is implemented which can enhance the convenience to the user, in cooperation with the portable audio device 500.

17 Claims, 5 Drawing Sheets

(56) References Cited

OTHER PUBLICATIONS

"Mount, Power, and Play Your iPod (R) in Your Car with the Belkin TuneBase (TM) FM for IPod and TuneBase FM for IPod nano; Compatible with All-Size IPod Devices, Sleek, New Designs Offer Improved FM Transmission", Business Wire (NEw York), Beklin Corp., p. 1, Jan. 5, 2006.

Mount, Power, and Play Your iPod (R) nano in Your Car with the Belkin TuneDeck (TM) for iPod nano; By Integrating a Cradle and Casette Deck, TuneDeck Offers a Clean and Convenient Way to Let You Enjoy Your Music:, Business Wire (New York),. Beklin Corp., p. 1, Jan. 19, 2006.

* cited by examiner

AUDIO DEVICE

TECHNICAL FIELD

The present invention relates to an audio device.

BACKGROUND ART

In recent years, portable audio devices, which have functions to store music data being distributed via a communication network or read down from a music CD (Compact Disk) into an internal storage media and to replay audio on the basis of data stored upon such storage media, have become commercially available. Such a portable audio device is compact and also light in weight, and they have become very widespread, since it is possible to enjoy music and so on anywhere without difficulty.

As the portable audio device, many different types of model are currently supplied to be utilized on a portable basis for enjoying music outdoors as well as for enjoying the music under a satisfactory audio replay environment, wherein the portable audio device is connected to another audio device such as a home audio device or a car audio device or the like, each of which has perfected speakers and so on. Moreover, as an audio device to which a portable audio device can be connected, a type of device has also come on the market which has the function to supply charging power to a portable audio device to which it is connected, because generally a portable audio device can be charged up with electrical power.

As a technique related to such an audio device which is endowed with a function of supplying charging power to a portable audio device, the technique for enhancing the ease of use for performing audio replay by using the data stored in the storage medium in the portable audio device, while charging (refer to Patent Reference #1; hereinafter it is referred to as the "prior art"). In the technique disclosed in the prior art, while the portable audio device is charged, actuation input is performed by using actuation input part, not to an inherent actuation input part configured to be" provided to the portable audio device, but rather to an actuation input part configured to be provided to the audio device having the function for supplying charging power. Then, audio replay may be performed by using the data stored in the internal storage medium of the portable audio device, and thereby replay audio may be outputted from the speakers of the audio device.

Patent Reference #1: Japanese Patent Publication 3,714,882.

DISCLOSURE OF THE INVENTION

Problems to be Solved by the Invention

However, in the above described prior art, if a novel type of the portable audio device having extended functions are appeared upon the market, it becomes necessary to perform a version upgrade on the audio device in order to be able to deal with this novel type of device. If the version upgrade is not performed, operation control of the portable audio device with the audio device as normal becomes impossible. As a result, it may become impossible to perform the actuation input to the actuation input part configured to provide to the audio device to perform audio replay by using the data being stored upon the internal storage medium of the portable audio device, while charging up.

Moreover, according to the circumstances of the user, an inherent actuation input part of the portable audio device is sometimes preferably used for inputting a control command for audio replay by using the data stored upon the storage medium in the portable audio device. On the other hand, an actuation input part of the audio device to which the portable audio device is connected is sometimes preferably used.

Due to this, there is a requirement for a technique for outputting the replay audio from the speaker of the audio device by using the data stored in the storage medium in the portable audio device. Moreover, there is a requirement for a technique for performing the actuation input for replaying audio by using the data being stored upon the storage medium in the portable audio device through the most preferably actuation input part for the users. As one of issues to be solved by the invention, it is mentioned such as the technique to respond the needs.

The present invention has been conceived in consideration of the circumstances described above. The object of the present invention is to provide a novel audio device, being operated together with the portable audio device and improve the convenience for the user.

Means for Solving the Problem

The audio device of the present invention is an audio device which performs replay of audio based on an external audio signal outputted from a portable audio device, comprising: a power supply part configured to supply power of a predetermined voltage to said portable audio device; an operability notification part configured to notify operability information to said portable audio device, wherein the operability information specifies whether or not inherent actuation input using an inherent actuation input part configured to provide to said portable audio device is to be possible; a control part configured to control the content of notification from said operability notification part to said portable audio device; and an audio replay part configured to replay audio depending on said external audio signal.

BEST MODES FOR CARRYING OUT THE INVENTION

In the following, an embodiment of the present invention will be explained with reference to FIGS. 1 to 5. Note that, in the following explanation and drawings, the same reference symbols are appended to elements which are the same or equivalent, and duplicated explanation will be omitted.

Configuration

Figure 1:
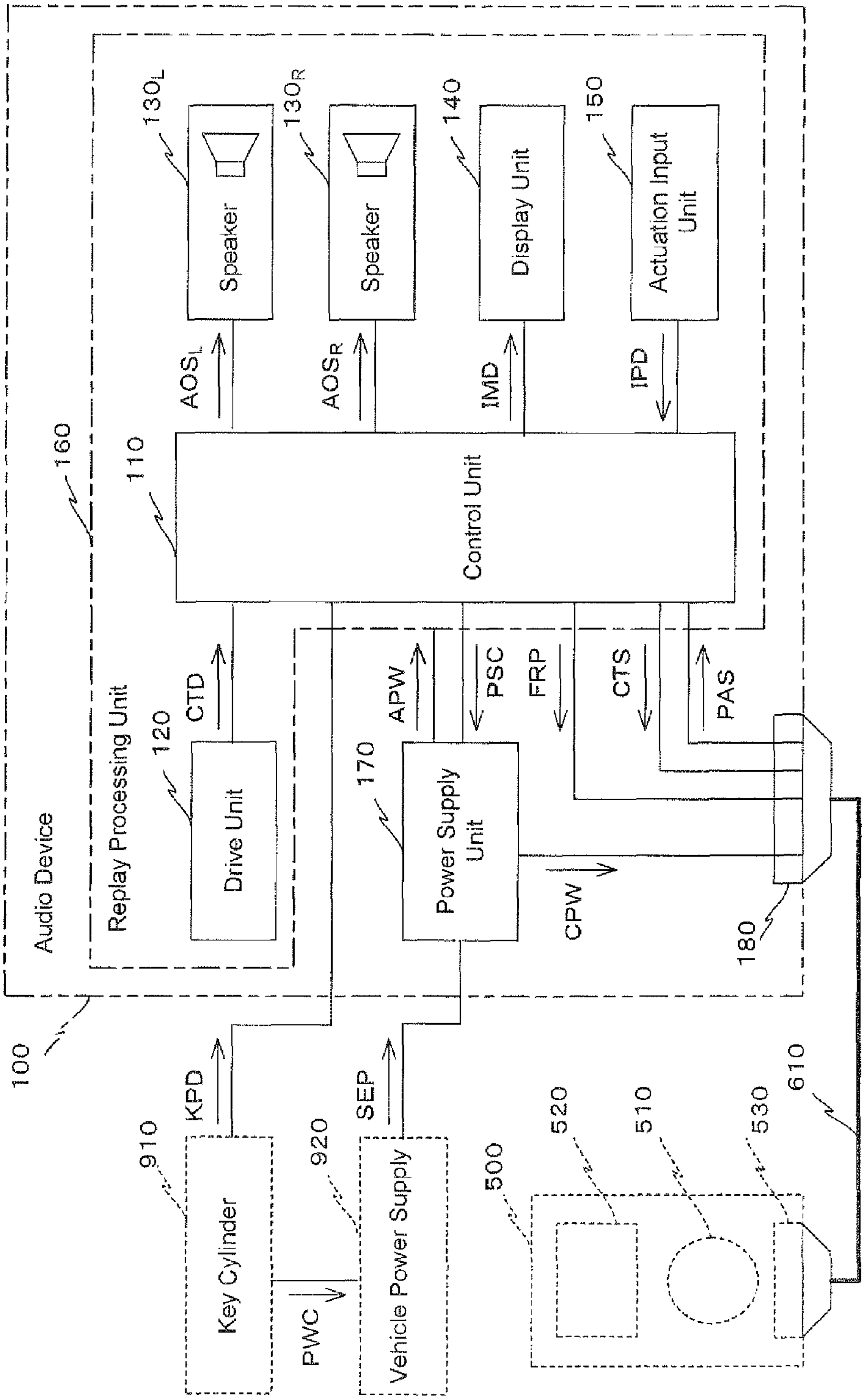
FIG. 1 is a block diagram schematically showing the configuration of an audio device according to an embodiment of the present invention.

In FIG. 1, the schematic configuration of an audio device 100 according to the embodiment is shown as a block diagram. Note that, in the following explanation, it will be supposed that the audio device 100 is a device which is mounted to a vehicle CR.

As shown in FIG. 1, the audio device 100 operate by using power SEP which is supplied from a vehicle power supply 920 such as a vehicle battery or the like. The vehicle power supply 920 includes a back up power supply and an accessory power supply. One of the power supplies is chosen depending on the operating status of the vehicle, which is determined by rotational operation of the key inserted in the key cylinder 910 by the user, as a power source. Note that the rotational state of the key inserted into the key cylinder 910 is reported from the key cylinder 910 to the audio device 100 as key position information KPD.

Moreover, a portable audio device 500 is connectable to the audio device 100 via a cable 610. The portable audio device 500 decides whether or not actuation input through an actuation input part 510 is possible based on a function setting report FRP reported from the audio device 100. If the result of the decision is affirmative, then the portable audio device 500 performs processing for audio replay or for display on a display part 520, according to the actuation input performed on the actuation input part 510 by itself. On the other hand, if the result of the decision is negative, then the portable audio device 500 performs the processing for audio replay or for display on the display part 520, according to control commands CTS from the audio device 100. Moreover, the portable audio device 500 charges up its internal battery using charging power CPW supplied from the audio device 100.

The portable audio device 500 has the function for replaying audio content recorded on an audio recording medium. When it is connected to the audio device 100 via the cable 610 connected to a connector 530, it supplies analog audio signals $PAS_L$ and $PAS_R$ to the audio device 100.

As shown in FIG. 1, the audio device 100 comprises a replay processing unit 160 and a power supply unit 170 as a power supply part. Moreover, the audio device 100 comprises a connector 180 to which the cable 610 is connected.

The replay processing unit 160 comprises a control unit 110, a drive unit 120 as an internal sound generation part, and a left speaker $130_L$ and a right speaker $130_R$ as audio replay part. Moreover, the audio device 100 comprises a display unit 140, an actuation input unit 150 which serves as an actuation input part, and a power supply unit 170 which serves as a power supply part.

Note that the above described elements 120 through 150 and 170 are connected to the control unit 110, and operate under the control of the control unit 110.

The control unit 110 controls the audio device 100 as a whole. The details of the control unit 110 will be described hereinafter.

When the drive unit 120 is received the replay command for the audio content from the control unit 110 under the condition wherein a recording medium, on which some audio content is recorded, is loaded to the drive unit 120, it reads out the audio content, specified by the command, from the recording medium. The read out result of the audio content is sent to the control unit 110 as content data CTD, an audio signal.

The left speaker $130_L$ performs replay output of the audio corresponding to the left audio signal $AOS_L$ from the control unit 110. The right speaker $130_R$ performs replay output of the audio corresponding to the left audio signal $AOS_R$ from the control unit 110.

The display unit 140 comprises: (i) a display device such as a liquid crystal display panel, an organic EL (Electro-Luminescence) panel, a PDP (Plasma Display Panel), and the like; (ii) a display controller such as a graphic renderer and the like for performing overall control of the display unit 140, based on display control data sent from the control unit 110; and (iii) a display image memory or the like for storing display image data. The display unit 140 displays actuation guidance information and so on, under the control of the control unit 110.

The actuation input unit 150 is composed of a key unit arranged on the main body portion of the audio device 110, or of a remote input device and the like having a key unit. Here, as the key unit provided upon the main body portion, a touch panel arranged on the display device of the display unit 140 may be used. Note that, instead of a structure having the key unit, the structure for audio input may also be used.

The details of the operation of the audio device 100 are set, according to the input actuation to the actuation input unit 150 by the user. For example, setting for audio content, setting for audio content search, volume adjustment for the audio signals outputted from the speakers $130_L$ and $130_R$, and so forth may be performed by using the actuation input unit 150, which sends this input content to the control unit 110.

Figure 2:
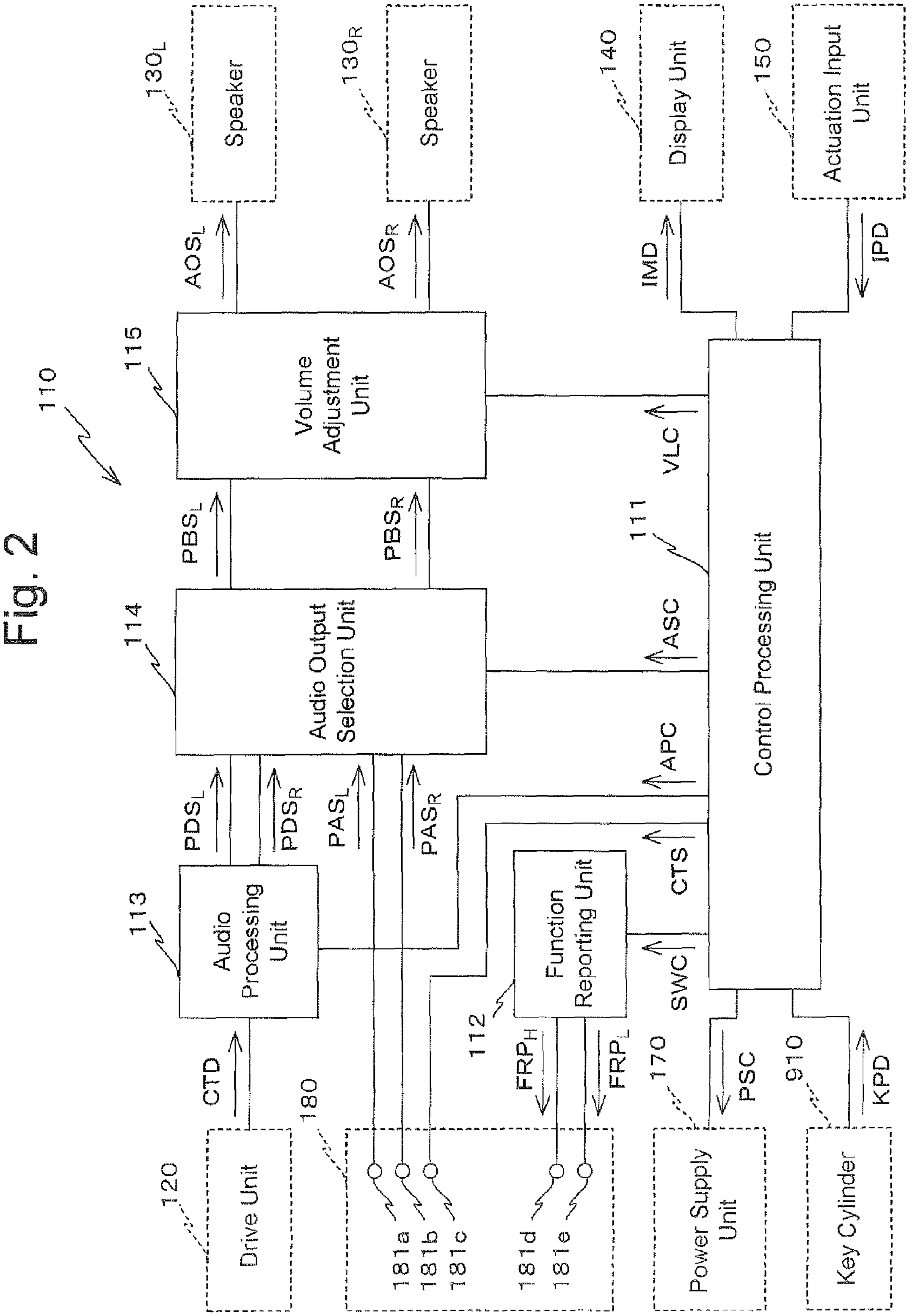
FIG. 2 is a block diagram showing the configuration of a control unit of FIG. 1.

The control unit 110 performs overall control of the audio device 100, as described above. As shown in FIG. 2, the control unit 110 comprises a control processing unit 111 as a control part, and a function reporting unit 112 as an operability notification part. The control unit 110 comprises an audio processing unit 113, an audio output selection unit 114 as a signal selection part, and a volume adjustment unit 115 as a volume adjustment part.

The control processing unit 111 analyzes the actuation input data IPD received from the actuation input unit 150. Then, based on the results of the analysis, the control processing unit 111 controls the power supply unit 170, the function reporting unit 112, the audio processing unit 113, the audio output selection unit 114, and the volume adjustment unit 115. Commands issued in the control include a power supply control command PSC for the power supply unit 170, a function reporting control command SWC for the function reporting unit 112, an audio content processing control command APC for the audio processing unit 113, an output audio selection control command ASC for the audio output selection unit 114, and a volume adjustment control command VLC for the volume adjustment unit 115.

If the control processing unit 111 let the function reporting unit 112 send a function report that it is impossible to perform actuation input through the actuation input part 510 arranged in the portable audio device 500, the control processing unit 111 outputs control commands CTS for controlling the operation of the portable audio device 500 to a terminal 181*c* of the connector 180. As a result, the control commands CTS is sent to the portable audio device 500 via the cable 610.

The function reporting unit 112 reports to the portable audio device 500 function setting information FRP (expressed as two signal lines $FRP_H$ and $FRP_L$), which is operability information showing whether or not actuation input is possible by using the actuation input part 510 arranged on the portable audio device 500 via the cable 610. In this embodiment, the resistance value between the signal line $FRP_H$ and the signal line $FRP_L$ is varied depending on a function reporting control command SWC from the control processing unit 111, thereby reporting to the portable audio device 500 as to whether or not actuation input is possible through the actuation input part 510.

Figure 3:
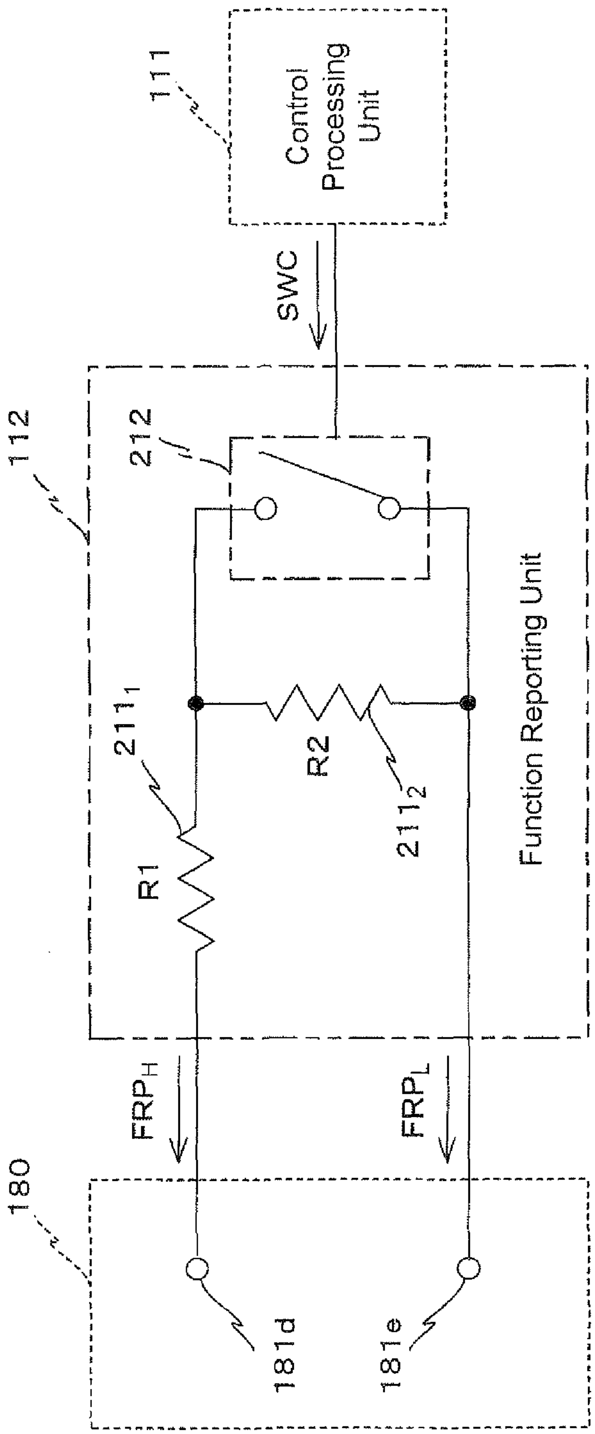
FIG. 3 is a block diagram showing the configuration of a function reporting unit of FIG. 2.

As shown in FIG. 3, the function reporting unit 112 comprises resistance elements $211_1$ and $211_2$ and a switching element 212. The resistance element $211_1$ has a resistance value R1, and the resistance element $211_2$ has a resistance value R2. The switching element 212 has two terminals, one of which is connected to a terminal 181*d* of the connector 180, and the other is connected to a terminal 181*e* of the connector 180. The ON/OFF operation of the switching element 212 is performed according to the function reporting control commands SWC from the control processing unit 111.

Note that the portable audio device 500 determines the functions of the audio device 100, namely, the type of the audio device 100, by measuring the resistance value between the terminals 181*d* and 181*e* of the connector 180. In other words, when the switching element 212 is OFF, then the portable audio device 500 recognizes that the audio device 100 is a mere charging up device based on the resistance value between the terminals 181*d* and 181*e* (R1+R2) thereby deciding that actuation input through the actuation input part 510 is possible. When the switching element 212 is ON, the portable audio device 500 recognizes that this audio device 100 is a remote actuation device based on the resistance value between the terminals 181*d* and 181*e* (R1), and the operation for the portable audio device 500 is placed under the control by the audio device 100. Then, the portable audio device 500 decides that that actuation input through the actuation input part 510 arranged on the portable audio device 500 is impossible.

Returning to FIG. 2, when the audio processing unit 113 is received a report that the content including audio content to be replayed is designated from the actuation input unit 150, the audio processing unit 113 reads out the content data CTD corresponding to the content to be replayed from the drive unit 120 according to an audio content processing control command APC. Then it generates digital audio sound data signal from the content data CTD read out from the drive unit 120. Subsequently, the audio processing unit 113 analyzes the generated digital audio data signal, and separates it according to channel setting information included in the digital audio data signal for supplying individual digital audio data signals to the above described speakers $\mathbf{130}_L$ and $\mathbf{130}_R$.

The audio processing unit 113 includes two DA (Digital to Analog) converters which have mutually similar structures, corresponding to the above two digital audio data signals. The audio processing unit 113 converts the digital audio data signals separated as described above into analog audio signals. In this way, two analog audio signals $PDS_L$ and $PDS_R$ separated for the two speakers $\mathbf{130}_L$ and $\mathbf{130}_R$ respectively are outputted to the audio output selection unit 114.

According to an output audio selection control command ASC from the control processing unit 111, the audio output selection unit 114 selects either one of the analog audio signals $PAS_L$ and $PAS_R$, which are the audio signals outputted from the portable audio device 500, or the analog audio signals $PDS_L$ and $PDS_R$ which have sent from the audio processing unit 113, as the audio to be outputted from the speakers $\mathbf{130}_L$ and $\mathbf{130}_R$ respectively.

Figure 4:
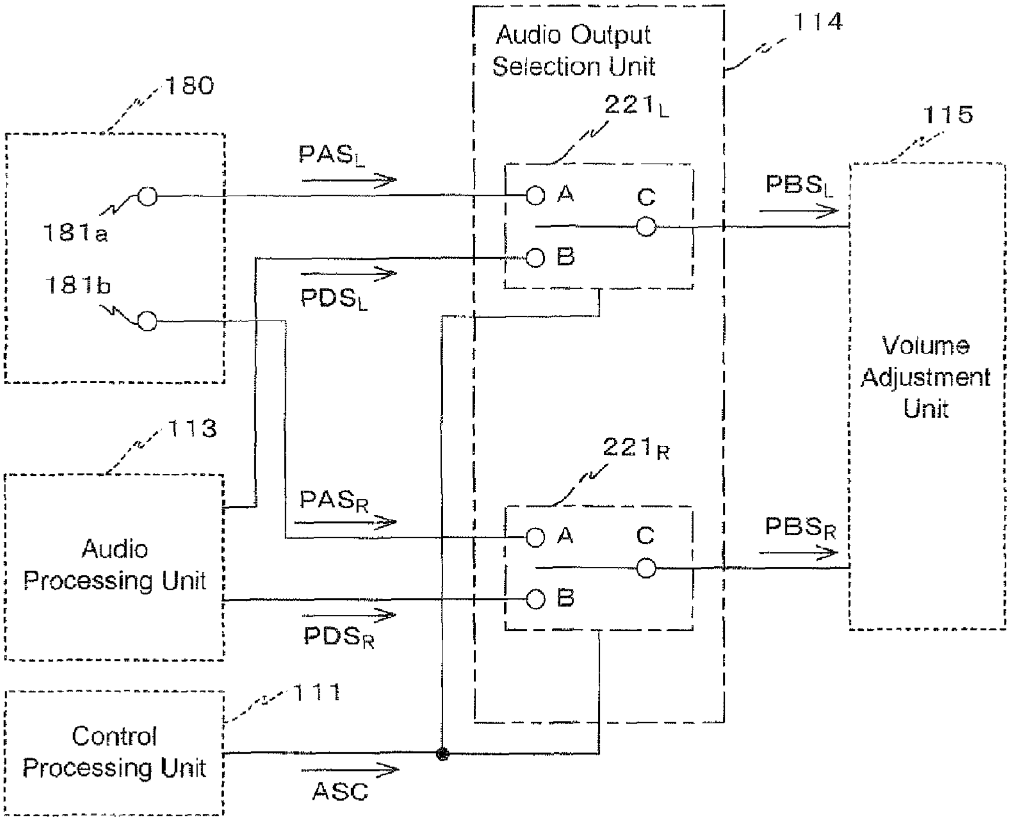
FIG. 4 is a block diagram showing the configuration of an audio output selection unit of FIG. 2.

As shown in FIG. 4, the audio output selection unit 114 comprises switching elements $\mathbf{221}_L$ and $\mathbf{221}_R$. The switching element $\mathbf{221}_L$ is used for selecting the audio to be output from the speaker $\mathbf{130}_L$, while the switching element $\mathbf{221}_R$ is used for selecting the audio to be output from the speaker $\mathbf{130}_R$.

The switching element $\mathbf{221}_L$ has terminals A, B, and C. On the switching element $\mathbf{221}_L$, the terminal A is connected to a terminal 181*a* of the connector 180, and the terminal B is connected to the audio processing unit 113. The terminal C is connected to the volume adjustment unit 115. On this switching element $\mathbf{221}_L$, the analog audio signal $PAS_L$ output from the portable audio device 500 is supplied to the terminal A, while the analog audio signal $PDS_L$ from the audio processing unit 113 is supplied to the terminal B.

Similarly to the switching element $\mathbf{221}_L$, the switching element $\mathbf{221}_R$ has terminals A, B, and C. On this switching element $\mathbf{221}_R$, the terminal A is connected to an output terminal 181*b* of the connector 180, and the terminal B is connected to the audio processing unit 113. The terminal C is connected to the volume adjustment unit 115. On this switching element $\mathbf{221}_R$, the analog audio signal $PAS_R$ output from the portable audio device 500 is supplied to the terminal A, while the analog audio signal $PDS_R$ from the audio processing unit 113 is supplied to the terminal B.

Each of these switching elements $\mathbf{221}_L$ and $\mathbf{221}_R$ operates according to the audio selection control command ASC from the control processing unit 111. The audio signal selected by the audio output selection unit 114 is sent from the C terminals of the switching elements $\mathbf{221}_L$ and $\mathbf{221}_R$ to the volume adjustment unit 115 as the analog audio signals $PBS_L$ and $PBS_R$.

Returning to FIG. 2, the volume adjustment unit 115 adjusts the volumes of the analog audio signals $PBS_L$ and $PBS_R$ sent from the audio output selection unit 114, according to the volume adjustment control commands VLC from the control processing unit 111. The volume adjustment unit 115 comprises two amplifiers having mutually similar structures, corresponding to the speakers $\mathbf{130}_L$ and $\mathbf{130}_R$, thereby adjusting the levels of the analog audio signals. The results of the adjustment are output towards the speakers $\mathbf{130}_L$ and $\mathbf{130}_R$ as a left audio signal $AOS_L$ and a right audio signal $AOS_R$.

Returning to FIG. 1, the power supply unit 170 uses power SEP supplied from the vehicle power supply 920 to generate power APW for the operation of the replay processing unit 160, and charging power CPW being supplied to the portable audio device 500. Here, the generation of the charging power CPW is performed according to a power supply control command PSC from the control processing unit 111.

Figure 5:
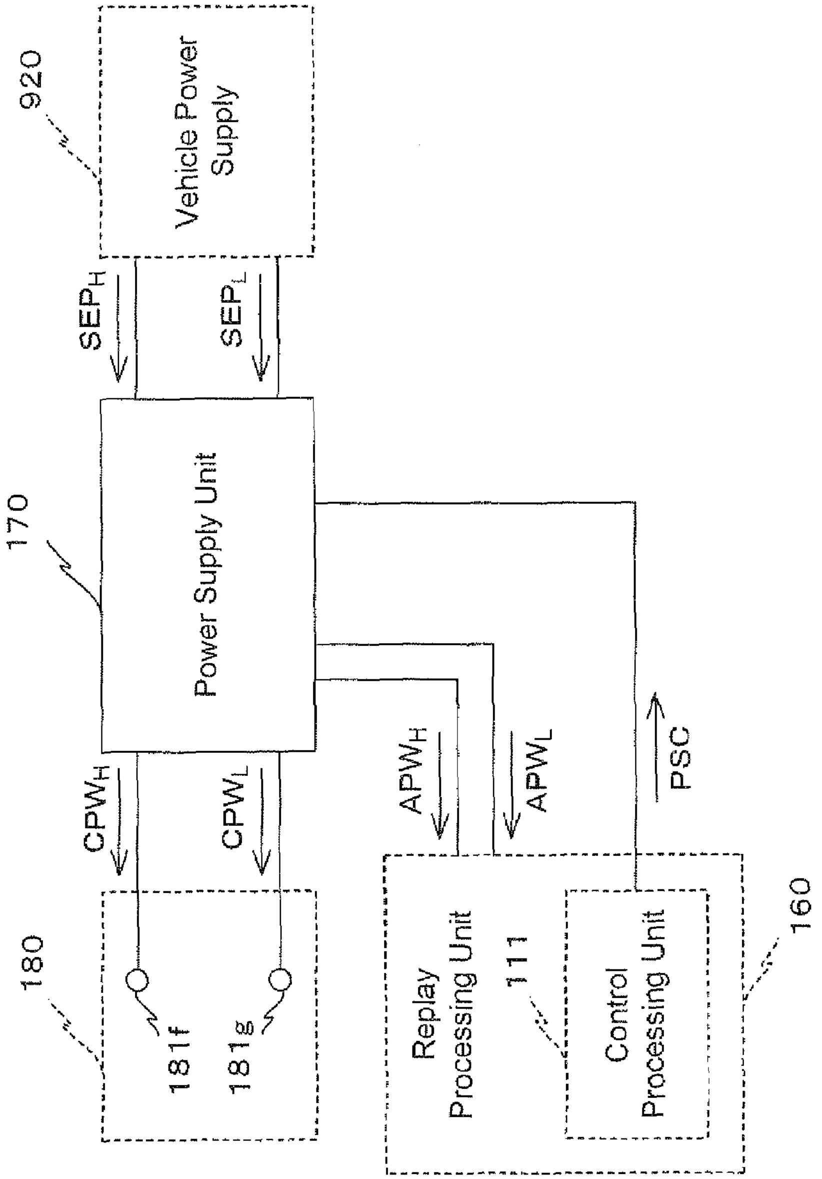
FIG. 5 is a figure for explanation of inputs to and outputs from a power supply unit of FIG. 1.

Note that, as shown in FIG. 5, the power SEP is supplied at two levels: a higher supply level $SEP_H$ and a lower supply level $SEP_H$ [sic]. In this embodiment, the lower supply level $SEP_L$ is set as ground level.

The power supply unit 170 supplies the operating power APW to the replay processing unit 160 at two levels: a higher supply level $APW_H$ and a lower supply level $APW_L$. In this embodiment, the low supply level $APW_L$ is set as the ground level. The potential difference between the lower supply level $APW_L$ and the higher supply level $APW_H$ is an appropriate voltage value for the replay processing unit 160 to operate.

The power supply unit 170 supplies the charging power CPW to the terminals 181*f* and 181*g* of the connector 180 at two levels: a higher supply level $CPW_H$ and a lower supply level $CPW_L$. In this embodiment, the lower supply level $CPW_L$ is set as ground level, and the potential difference between the lower supply level $CPW_L$ and the higher supply level $CPW_H$ is an appropriate voltage value for charging of the portable audio device 500.

Note that, in this embodiment, as the above described vehicle operational states, there are mentioned such as an OFF state in which only operating power is supplied from the back up power supply, an accessory ON state in which operating power is supplied from both of the back up power supply and from the accessory power supply, an ignition ON state in which operating power is also supplied from the accessory power supply to a control system vehicle device, and a starting state in which the vehicle is put into a state in which it is capable of moving. The control processing unit 111 issues a power supply control command PSC that the power should be supplied to the power supply unit 170 when the operational state of the vehicle is any one of the states among the accessory ON state, the ignition ON state, and the starting state. When the operational state of the vehicle is the OFF state, the control processing unit 111 does not issue any power supply control command that the power should be supplied to the power supply unit 170. Therefore, the charging power CPW is not supplied to the portable audio device 500.

(Operation)

Next, the operation of the audio device 100 having the configuration described above will be explained, mainly focusing on the replay of an external audio signal which is output from the portable audio device 500.

As a premise, the portable audio device 500 is connected to the audio device 100 via the cable 610. The analog audio signals $PAS_L$ and $PAS_R$ from the portable audio device 500 selected in the audio output selection unit 114 is output as the analog audio signals $PBS_L$ and $PBS_R$ in the audio device 100. The analog audio signals $PAS_L$ and $PAS_R$ is selected in the audio output selection unit 114 by using that the actuation input should make output replay audio based on the analog audio signals $PAS_L$ and $PAS_R$ from the speakers $\mathbf{130}_L$ and $\mathbf{130}_R$ through the actuation input unit 150, and the control processing unit 111 sends that the audio output selection control command ASC for selecting the audio signals outputted from the portable audio device 500 to the audio output selection unit 114. Note that, in this case, the A terminals and the C terminals of the switching elements $\mathbf{221}_L$ and $\mathbf{221}_R$ are electrically connected in the audio output selection unit 114.

Insertion of the key to key cylinder 910 and rotation of the key make the operational state of the vehicle, which is depending on the key position, set one state among the accessory ON state, the ignition ON state, and the starting state. In these states, the accessory power supply provides the operation power to the audio device 100, and the audio device 100 executes normal operation. The operational state of the vehicle is sent to the control processing unit 111 from the key cylinder 910 as the key position information KPD.

After the control processing unit 111 recognizes the operational state of the vehicle is any one of the accessory ON state, the ignition ON state, and the starting state based on the key position information KPD, the control processing unit 111 sends to the power supply unit 170 a power supply control command PSC for supplying the power to the portable audio device 500. The power supply unit 170 that received the power supply control command PSC generates the charging power CPW from the power SEP supplied from the vehicle power supply 920. Thus, the charging power CPW generated is supplied to the portable audio device 500 via the connector 180 and the cable 610. As a result, charging up of the battery in the portable audio device 500 is performed.

Note that the power supply unit 170 generates the power APW for operation of the replay processing unit 160 to supply it to the replay processing unit 160, irrespective of whether or not it has received any power supply control command PSC.

During execution of normal operation in the audio device, the input that allows user to enable for performing actuation input utilizing the actuation part 510 arranged on the portable audio device 500 by using the actuation input unit 150 is performed, then the actuation input data IPD showing above is sent to the control processing unit 111. When the control processing unit 111 receives the actuation input data IPD, it sends a function reporting control command SWC for switching element 212 should be turned OFF to the function reporting unit 112 (refer to FIG. 3). As a result, the portable audio device 500 recognizes the audio device 100 as a charging device. Thus, the portable audio device 500 recognizes the audio device 100 as a charging device, thereby the actuation input by using the actuation unit arranged on the portable audio device 500 becomes possible. In this state, when the user utilizes the actuation part 510 of the portable audio device 500 to replay the audio content recorded on the internal audio recording medium in the portable audio device 500; the analog audio signals $PAS_L$ and $PAS_R$, audio signals, are sent to the audio device 100 via the cable 610.

On the other hand, during execution of normal operation in the audio device 100, the input that prevents user to enable for performing actuation input utilizing the operation part 510 arranged on the portable audio device 500 by using the actuation input unit 150 is performed, then the actuation input data IPD showing above is sent to the control processing unit 111. After receiving of the actuation input data IPD, the control processing unit 111 sends to the function reporting unit 112 the function reporting control command SWC for switching element 212 should be turned ON (refer to FIG. 3). As a result, the portable audio device 500 recognizes the audio device 100 as a remote actuation device. Thus, the portable audio device 500 recognizes the audio device 100 as a remote actuation device, thereby the actuation input by using the actuation part arranged on the portable audio device 500 becomes impossible, while remote actuation with the audio device 100 becomes possible.

In this state, when the user utilizes the actuation unit 150 of the audio device 100 to replay the audio content recorded on the internal audio recording medium in the portable audio device 500, the analog audio signals $PAS_L$ and $PAS_R$, the audio signals, are sent to the audio device 100 via the cable 610.

In the audio device 100 which has received the analog audio signals $PAS_L$ and $PAS_R$, as described above, these analog audio signals $PAS_L$, and $PAS_R$ are selected by the audio output selection unit 114, and are sent to the volume adjustment unit 115 as the analog audio signals $PBS_L$ and $PBS_R$.

The volume adjustment unit 115 adjusts the volume of the analog audio signals $PBS_L$ and $PBS_R$ sent from the audio output selection unit 114, according to the volume adjustment control VLC from the control processing unit 111. Then, the left audio signal and the right audio signal $AOS_L$ and $AOS_R$, which are obtained as the result from the adjustment, are output to the speakers $\mathbf{130}_L$ and $\mathbf{130}_R$ respectively. Then, replay audio based on the result on the adjustment is output from the speakers $\mathbf{130}_L$ and $\mathbf{130}_R$ towards the music space.

Note that, if actuation input for making the replay audio based on the analog audio signals $PDS_L$ and $PDS_R$ output from the speakers $\mathbf{130}_L$ and $\mathbf{130}_R$ is performed by using the actuation input unit 150, then the audio bore by the content data CTD read by the drive unit 120 is reproduced and output from the speakers $\mathbf{130}_L$ and $\mathbf{130}_R$. In this case, according to the actuation input for outputting the replay audio based on the analog audio signals $PDS_L$ and $PDS_R$, the control processing unit 111 sends to the audio output selection unit 114 an output audio selection control command ASC for selecting the audio signals output from the audio processing unit 113. As a result, the B terminal and the C terminal of the switching elements $\mathbf{221}_L$ and those on the element $\mathbf{221}_R$ in the audio output selection unit 114 are electrically connected.

In this state, when the user performs input of a replay command for audio content, specifying the audio content recorded on the recording medium loaded into the drive unit 120, to the actuation input unit 150, the content data CTD for the audio content is sent from the drive unit 120 to the audio processing unit 113. In the audio processing unit 113, the content data CTD is processed as described above to generate analog audio signals $PDS_L$ and $PDS_R$. The analog audio signals $PDS_L$ and $PDS_R$ thus generated are selected by using the audio output selection unit 114, and are sent to the volume adjustment unit 115 as the analog audio signals $PBS_L$ and $PBS_R$.

Hereinafter, similarly to these for the analog audio signals $PAS_L$ and $PAS_R$, the volume is adjusted by the volume adjustment unit 115, and replay audio based on the result of the adjustment is output from the speakers $\mathbf{130}_L$ and $\mathbf{130}_R$ into the music space.

As has been explained above, in this embodiment, the resistance value of the function reporting unit 112 is switched by using actuation input to the actuation input unit 150 of the audio device 100, and it makes possible to transfer the actuation function of the portable audio device 500 to the audio device 100 side, or return to the portable audio device 500 side, as desired. In this manner, the position where the actuation for replaying audio recorded in the portable audio device 500 is performed can be switched. Therefore, it is possible to perform replay of audio recorded in the portable audio device 500 by using the speakers of the audio device 100 in a reliable manner, by returning the position of actuation to the portable audio device 500, even if the version of the audio device 100 and the version of the portable audio device 500 do not match one another.

Depending on the actuation input to the actuation input unit 150 of the audio device 100, the permission/prohibition of the actuation by the person owns the portable audio device 500 is placed under the control of the audio device 100 side.

In this embodiment, when the operational state of the vehicle is on any one of the accessory ON state, the ignition ON state, and the starting state, the charging power CPW to the portable audio device 500 is supplied; however, when it is on the OFF state, the charging power CPW to the portable audio device 500 is not supplied. Due to this, the power consumption of the vehicle power supply 920 while the engine is stopped can be reduced.

Further, in this embodiment, as the audio to be output from the speakers $\mathbf{130}_L$ and $\mathbf{130}_R$, either the analog audio signals $PAS_L$ and $PAS_R$, which is output from the portable audio device 500, or the analog audio signals $PDS_L$ and $PDS_R$, on which audio content recorded on the recording medium is replayed and loaded into the drive unit 120. Due to this, through the actuation of the actuation input unit 150, the user can freely select the audio signal to be output.

Consequently, according to this embodiment, cooperation between the portable audio device and the other device can be promoted, thereby promoting the convenience for the user.

Modified Embodiments

The present invention is not limited to that described above; and it may be varied in many ways.

For example, in the embodiment described above, it was arranged to provide two speakers, however, it would also be possible to arrange to output the sound from only one speaker, or to output the sound from three or more speakers adaptive to a multi-channel setup.

In the embodiment described above, as the switching element 212 in the function reporting unit 112, it is possible to employ a switching element such as electronic type one, a transistor, and a mechanical type one, a reed relay, and the like.

Furthermore, in the embodiment described above, when the function reporting unit 112 changes the content reported to the portable audio device 500 by changing the resistance value seen from externally. In contrast, configuration of the function reporting unit 112 may be these that match to the decision methods for the function employed in the portable audio device, and desirable one can be employed.

In the embodiment described above, the present invention was applied to an audio device which was mounted to a vehicle, it would also be possible to apply the present invention to an audio device mounted to some mobile device other than a vehicle; or it would also be possible to apply the present invention to an audio device for household use.

Further, in the embodiment described above, the present invention was applied to an audio device for replaying audio content, it would also be possible to apply the present invention to a device for replaying a moving image along with audio content.

Note that a part or the entire control unit 110 in the embodiment described above may be constituted by using a computer as a calculation part, comprising a central processing device (CPU), a DSP (Digital Signal Processor), a read only memory (ROM), a random access memory (RAM), and the like; then a part or the entire of the processing may be executed by the previously prepared program. The program is recorded on the medium such as the hard disk, CD-ROM, DVD and the like, which can be read out by the computer, and it is read out by the computer to be executed. The program may be obtained as a form recorded on the portable type medium such as CD-ROM, DVD and so forth, or the form being distributed via a network such as the internet or the like.

The invention claimed is:

1. An audio device mountable on a vehicle that performs replay of audio based on an external audio signal outputted from a portable audio device, comprising:
- an interface for connecting to said portable audio device;
- a power supply part configured to supply power of a predetermined constant voltage to said portable audio device;
- an audio replay part configured to replay said audio based on said external audio signal;
- an actuation input part configured to be used by a user for input of an actuation or a command for controlling replay of said audio; and
- a control part configured i) to control an actuation function on said portable audio device for replaying said audio, and ii) to switch control of said actuation function between one of a user input part arranged on said portable audio device and said actuation input part,
- wherein, in a first mode, the user input part arranged on said portable audio device is active for receiving user input for controlling replay of said audio, and in a second mode, said actuation input part is active for receiving user input for controlling replay of said audio, and
- wherein both of the switching of control of said actuation function and control of replay of said audio via said actuation input part are performed as a result of user input to said actuation input part while the portable audio device is connected to said interface.

2. An audio device according to claim 1, wherein said power supply part is configured to supply power at constant voltage to said portable audio device as power for charging.

3. An audio device according to claim 1, wherein said control part is configured to specify to said power supply part whether or not power should be supplied.

4. An audio device according to claim 1, wherein said control part is configured to send to said portable audio device, in response to a user input at said actuation input part, a notification to disable said user input part of said portable audio device.

5. An audio device according to claim 1, further comprising:
- an internal sound generation part configured to generate an internal audio signal; and
- a signal selection part configured to select as a selected signal either one of said internal audio signal and said external audio signal, and to output the selected signal to said audio replay unit, wherein said control part is configured to control said signal selection unit for selecting the selected signal.

6. An audio device according to claim 1, further comprising:

a volume adjustment part configured to adjust a volume of the audio replayed from said audio replay part, wherein said control part is configured to control said volume adjustment part to specify the volume of the audio replayed by said audio replay part.

7. An audio device according to claim 2, wherein said control part is configured to specify to said power supply part whether or not power should be supplied.

8. An audio device according to claim 2, wherein said control part is configured to send to said portable audio device, in response to a user input at said actuation input part, a notification to disable said user input part of said portable audio device.

9. An audio device according to claim 3, wherein said control part is configured to send to said portable audio device, in response to a user input at said actuation input part, a notification to disable said user input part of said portable audio device.

10. An audio device according to claim 2, further comprising:

an internal sound generation part configured to generate an internal audio signal; and a signal selection part configured to select as a selected signal either one of said internal audio signal and said external audio signal, and to output the selected signal to said audio replay unit, wherein said control part is configured to control said signal selection unit for selecting the selected signal.

11. An audio device according to claim 3, further comprising:

an internal sound generation part configured to generate an internal audio signal; and a signal selection part configured to select as a selected signal either one of said internal audio signal and said external audio signal, and to output the selected signal to said audio replay unit, wherein said control part is configured to control said signal selection unit for selecting the selected signal.

12. An audio device according to claim 4, further comprising:

an internal sound generation part configured to generate an internal audio signal; and a signal selection part configured to select as a selected signal either one of said internal audio signal and said external audio signal, and to output the selected signal to said audio replay unit, wherein said control part is configured to control said signal selection unit for selecting the selected signal.

13. An audio device according to claim 2, wherein a volume adjustment part configured to adjust the volume of the audio replayed from said audio replay part, wherein said control part configured to specify the volume of the audio replayed by said audio replay part, to said volume adjustment part.

14. An audio device according to claim 3, further comprising:

a volume adjustment part configured to adjust a volume of the audio replayed from said audio replay part, wherein said control part is configured to control said volume adjustment part to specify the volume of the audio replayed by said audio replay part.

15. An audio device according to claim 4, further comprising:

a volume adjustment part configured to adjust a volume of the audio replayed from said audio replay part, wherein said control part is configured to control said volume adjustment part to specify the volume of the audio replayed by said audio replay part.

16. An audio device according to claim 5, further comprising:

a volume adjustment part configured to adjust a volume of the audio replayed from said audio replay part, wherein said control part is configured to control said volume adjustment part to specify the volume of the audio replayed by said audio replay part.

17. An audio device according to claim 6, further comprising:

a volume adjustment part configured to adjust a volume of the audio replayed from said audio replay part, wherein said control part is configured to control said volume adjustment part to specify the volume of the audio replayed by said audio replay part.

* * * * *

UNITED STATES PATENT AND TRADEMARK OFFICE
CERTIFICATE OF CORRECTION

PATENT NO. : 8,526,631 B2
APPLICATION NO. : 12/532297
DATED : September 3, 2013
INVENTOR(S) : Takeo Nakabayashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 990 days.

Signed and Sealed this
Fifteenth Day of September, 2015

Michelle K. Lee

Michelle K. Lee
*Director of the United States Patent and Trademark Office*